Patented Dec. 1, 1936

2,062,782

UNITED STATES PATENT OFFICE 2,062,782

TREATMENT OF LECITHIN

Albert K. Epstein and Benjamin R. Harris, Chicago, Ill.

No Drawing. Application January 10, 1936, Serial No. 58,540

6 Claims. (Cl. 252—1)

Our invention relates to the treatment of lecithin and lecithin containing materials and has particular reference to the facilitation of the dispersion of lecithin in aqueous and oleaginous media and the preservation thereof over relatively long periods of time.

Lecithin has been used heretofore as an emulsifying agent and, as prepared from vegetable sources such as soya beans or other oil bearing seeds, has been marketed with a certain amount of oil present. Commercial lecithins generally consist of 60 to 65% of lecithins and related lipoid substances and of about 35 to 40% of triglyceride material. It has been found that, if all of the triglyceride material or other fat or oil is removed from the lecithin, the latter does not keep very well, one of its most objectionable characteristics being the liberation therefrom of choline and other nitrogenous substances which possess a fishy taste and flavor. For this reason commercial soya bean lecithin or peanut oil lecithin or lecithins derived from other sources contain about forty percent of vegetable oil. In some cases the natural oil, for example, soya bean oil, is removed and another fat, such as cocoa butter, is substituted therefor. In substantially all cases, however, a certain amount of an oleaginous material is present in order to preserve the lecithin.

The dispersion of commercial lecithin in water is rendered very difficult, particularly in view of the fact that the oleaginous material present hinders such dispersion of the lecithin in aqueous media. In the past, in order to satisfactorily disperse lecithin in aqueous media, it has been necessary to grind the lecithin with at least a portion of the aqueous material over a relatively long period of time.

We have discovered that when at least a portion of the oil or fat present in combination with commercial lecithin is replaced by diglycerides of higher fatty acids, a composition of matter is obtained which is stable, does not deteriorate, and is easily dispersable in water or other aqueous liquids or oleaginous materials. The vegetable oil present in commercial lecithins may be either partially or entirely replaced with diglycerides.

In general, the oil or fat present in commercial vegetable lecithin may be eliminated by means of differential solvents, the excess solvent removed, and then the substantially pure lecithin, which may contain only traces of oil or fat, is combined with a relatively large proportion of diglyceride or mixtures of diglycerides.

We have discovered that diglycerides of various melting points are miscible with lecithin and also with lecithin containing varying proportions of oils or fats. Indeed, it has been found that lecithin is soluble in diglycerides in substantial proportions, namely, of the order of 25% to 30%. While diglycerides such as distearine, for example, are difficult to disperse in water, when admixed with lecithins, they enable suitable aqueous suspensions to be made very readily. While it is practically impossible to make a water dispersion using, for example, distearine, which will contain large proportions of water, namely, 60% to 75% and even larger, and which will be homogeneous in character, with the use of our mixture we are enabled to produce uniform homogeneous dispersions containing about 80% to 90% of water.

The following examples are illustrative of how our invention can be carried out:

Example 1.—100 parts of commercial soya bean lecithin containing approximately 60% to 65% of lecithin and between 30% and 35% of soya bean oil are combined with 100 parts of melted commercial distearine. The mixture is then allowed to cool and the resultant product will be found to be very easily dispersed in water or other aqueous materials, when heated somewhat, as shown later.

Example 2.—100 parts of diolein are intimately admixed with 80 parts of soya bean lecithin. This mixture is readily dispersed in aqueous media by gradually adding thereto hot water while continually stirring, a uniform, homogeneous paste resulting. This paste can be further thinned out by the addition of water or other aqueous materials.

Example 3.—100 parts of diglycerides prepared from coconut oil fatty acids are melted and intimately mixed with 150 parts of commercial soya bean lecithin containing about 65% lecithin and 35% of soya bean oil. The lecithin may be dispersed quite easily in either aqueous or oleaginous materials.

Example 4.—50 parts of commercial lecithin (containing about 35% of triglyceride oil), 50 parts of white mineral oil and 100 parts of a diglyceride mixture (obtained by reesterifying a partially hydrogenated cottonseed oil with glycerine) are melted together and stirred and cooled until a homogeneous composition is obtained. This material lends itself readily to incorporation with aqueous material or into emulsions of oleaginous and aqueous materials.

We have found that commercial diolein and distearin are very effective for our present purposes but any diglyceride of a higher fatty acid or mixture of such acids may be satisfactorily employed. Other diglycerides which can be employed are those of lauric and myristic acids, or coconut oil fatty acids, linoleic acid, palmitic acid, etc., or any of the fatty acids or mixture of the fatty acids derived from animal or vegetable oils or from partially or completely hydrogenated fats or oils. By the term "higher fatty acids", we mean to cover fatty acids having at least 12 carbon atoms. With increasing molecular weight of the fatty acids, the diglycerides have a decreasing affinity for aqueous materials and are less readily dispersible therein. In general, we have found that diglycerides of fatty acids having between 12 and 18 carbon atoms are satisfactory, it being preferred to employ those falling within this range. It will be understood that pure diglycerides need not be employed, wholly satisfactory results being obtained with impure or commercial products.

The compositions of our invention have many uses in the arts where reduction of surface tension and modification of interfacial tension is desired. They may be used in emulsions of edible or inedible character in which both oleaginous and aqueous materials are present or in other types of emulsions. They may be employed in margarine, shortenings, and in other materials where lecithin has heretofore been employed.

It is indeed surprising that diglycerides such as distearin, which have little affinity for moisture and are dispersible with difficulty in aqueous media, should, when mixed with lecithin, particularly commercial vegetable lecithin, which is also difficulty dispersible in water, result in a composition which is so easily dispersed.

In addition to the advantages pointed out above, such as effecting a preservation of the lecithin and increasing its dispersibility characteristics, our compositions result in a more economical use of the lecithin. Because of the increased dispersibility of the lecithin, it can be dispersed in a larger volume of water and hence come into contact with a larger number or a larger area of interfaces. This brings about a saving in material cost since the lecithin is more efficiently utilized.

As an illustration of the use of our compositions, we may take the product of Example 1, melt it, and add to it an equal quantity of hot water, and allow it to cool while stirring, whereby a smooth, homogeneous paste containing 50% water is obtained. If desired, this paste may be thinned out with an equal amount of water, thereby producing a composition having a thick creamy mixture, uniform in nature, in which the lecithin and the distearine substance are thoroughly dispersed. It can be further thinned out with more water or aqueous liquids to produce a uniform, milky dispersion containing about 80% to 90% water. This dispersion or other dispersions containing varying amounts of water may be incorporated in cosmetic, pharmaceutical and edible or inedible emulsions in order to obtain an effective distribution of the lecithin therein. The lecithin-diglyceride composition, in the form of an aqueous-containing paste, may be incorporated in margarine either at the churn or into the plastic margarine emulsion and blended thereinto to effect a uniform distribution of both the lecithin and the diglyceride. The composition of my invention may also be effectively employed in lipsticks, dyes, dye discharging cakes and other compositions disclosed in Harris Patent No. 1,958,700, in floor waxes, textile oils, etc. For example, in the preparation of a solid lipstick which has a dye dispersed in a fatty medium, the use therein of the diglyceride-lecithin composition of our invention will give the lipstick mechanical strength if a diglyceride of high melting point is used and will generally increase the wetting capacity of the dye on the tissue. It may also be used as a dispersing agent in a solid self-sustaining cake which contains a dye discharging agent such as a sulphoxylate. In this environment it serves the purpose of producing good contact between the discharging agent and the textile.

While we have described our invention in connection with the use of vegetable lecithin, it will be understood that animal lecithin such as prepared from egg yolk and the like may be similarly treated.

The proportions of lecithin and diglycerides may vary within relatively wide proportions, it being necessary only to add sufficient diglycerides to the lecithin to accomplish the desired effect. In general, the diglycerides should constitute approximately 20% to 60% of the composition, although, for many purposes, compositions containing larger proportions of diglycerides are useful. However, compositions containing smaller proportions of diglycerides such as 10% or even less, or larger proportions such as 70%, are useful for the purpose.

Other ingredients may be incorporated into the lecithin-diglyceride mixture for the attainment of additive results. Thus, for example, waxes such as paraffin, beeswax, carnauba wax, etc., may be admixed with the lecithin-diglyceride product. So, also, may higher fatty acids, especially those containing from 12 to 18 carbon atoms, such as stearic acid, oleic acid, palmitic acid, etc., and mixtures of any two or more of such fatty acids.

What we claim as new and desire to protect by Letters Patent of the United States is:

1. A substantially dry composition of matter readily dispersible in aqueous media comprising an intimate mixture of lecithin and a diglyceride of a higer fatty acid, the lecithin comprising at least several percent of the composition.

2. A substantially dry composition of matter readily dispersible in aqueous media comprising an intimate, uniform mixture of lecithin, an oil or fat, and a diglyceride of a higher fatty acid, the lecithin comprising at least several percent of the composition.

3. A composition of matter comprising an aqueous dispersion of vegetable lecithin in intimate admixture with a diglyceride of a higher fatty acid, the lecithin comprising at least several percent of the composition.

4. A substantially dry composition of matter readily dispersible in aqueous media comprising commercial vegetable lecithin intimately admixed with a mixture of diglycerides of higher fatty acids, the lecithin comprising at least several percent of the composition.

5. A substantially dry composition of matter readily dispersible in aqueous media comprising commercial vegetable lecithin intimately admixed with a substantially equal amount of distearin.

6. A substantially dry composition of matter readily dispersible in aqueous media comprising commercial vegetable lecithin intimately admixed with a substantially equal amount of diolein.

ALBERT K. EPSTEIN.
BENJAMIN R. HARRIS.